(12) United States Patent
Ward et al.

(10) Patent No.: US 10,819,731 B2
(45) Date of Patent: Oct. 27, 2020

(54) EXCEPTION REMEDIATION LOGIC ROLLING PLATFORM

(71) Applicant: BANK OF AMERICA CORPORATION, Charlotte, NC (US)

(72) Inventors: Julia A. Ward, Charlotte, NC (US); Jonathan Michael Nauss, Charlotte, NC (US); Peter Jordan Langsam, San Francisco, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 381 days.

(21) Appl. No.: 15/889,799

(22) Filed: Feb. 6, 2018

(65) Prior Publication Data
US 2019/0245880 A1  Aug. 8, 2019

(51) Int. Cl.
*H04L 29/06* (2006.01)
*G06F 21/00* (2013.01)
*H04L 12/26* (2006.01)

(52) U.S. Cl.
CPC ...... *H04L 63/1433* (2013.01); *H04L 43/0817* (2013.01); *H04L 63/20* (2013.01); *H04L 63/1441* (2013.01)

(58) Field of Classification Search
CPC . H04L 63/1433; H04L 43/0817; H04L 63/20; H04L 63/1441; H04L 41/0672
See application file for complete search history.

(56) References Cited

U.S. PATENT DOCUMENTS

| | | | |
|---|---|---|---|
| 6,711,571 B2 | 3/2004 | Putzolu | |
| 7,000,247 B2 | 2/2006 | Banzhof | |
| 7,448,066 B2 | 11/2008 | Birk et al. | |
| 7,529,981 B2 | 5/2009 | Childress et al. | |
| 7,574,740 B1 * | 8/2009 | Kennis | H04L 63/1416 713/151 |
| 7,607,164 B2 * | 10/2009 | Vasishth | G06F 21/577 726/1 |
| 7,665,119 B2 | 2/2010 | Bezilla et al. | |
| 7,668,947 B2 | 2/2010 | Hutchinson et al. | |
| 7,698,275 B2 * | 4/2010 | O'Brien | G06Q 10/10 707/999.009 |
| 7,698,391 B2 | 4/2010 | Paliwal et al. | |

(Continued)

Primary Examiner — Lisa C Lewis
(74) Attorney, Agent, or Firm — Michael A. Springs; Moore & Van Allen PLLC; Jeffrey R. Gray

(57) ABSTRACT

The invention relates generally to monitoring and managing network components, such as monitoring the network components to determine the vulnerabilities of network components, implementing remediation plans for the vulnerabilities, instituting remediation suppression for acceptable uses, instituting network component exceptions and rolling exceptions to other network components automatically, and taking consequence actions for the vulnerabilities. A network component exception may be implemented for a network component when the network component data meets custom criteria. When the custom criteria is met, the network component is automatically rolled into the network component exception process to automatically associate network component exceptions with network components that have data that meets the custom criteria. The network component exceptions prevent vulnerability actions from being taken with respect to the associated network components.

20 Claims, 3 Drawing Sheets

(56) References Cited

U.S. PATENT DOCUMENTS

| | | | |
|---|---|---|---|
| 7,711,683 B1 | 5/2010 | Watanabe et al. | |
| 7,761,920 B2 | 7/2010 | Bezilla et al. | |
| 7,774,848 B2 * | 8/2010 | D'Mello | G06F 21/577 |
| | | | 726/25 |
| 7,818,788 B2 | 10/2010 | Meier | |
| 7,962,696 B2 | 6/2011 | Steely, Jr. et al. | |
| 7,962,960 B2 | 6/2011 | Fudge | |
| 7,992,033 B2 | 8/2011 | Childress et al. | |
| 8,224,937 B2 | 7/2012 | Childress et al. | |
| 8,291,093 B2 | 10/2012 | Choe | |
| 8,341,691 B2 | 12/2012 | Bezilla et al. | |
| 8,375,113 B2 | 2/2013 | Sinn et al. | |
| 8,561,134 B2 | 10/2013 | Bezilla et al. | |
| 8,561,175 B2 | 10/2013 | Williams et al. | |
| 8,613,080 B2 * | 12/2013 | Wysopal | G06F 11/3612 |
| | | | 726/19 |
| 8,769,412 B2 | 7/2014 | Gill et al. | |
| 8,776,170 B2 | 7/2014 | Bezilla et al. | |
| 8,924,577 B2 | 12/2014 | Choe | |
| 8,984,586 B2 | 3/2015 | Bezilla et al. | |
| 8,984,643 B1 | 3/2015 | Krisher et al. | |
| 9,100,431 B2 | 8/2015 | Oliphant et al. | |
| 9,154,523 B2 | 10/2015 | Bezilla et al. | |
| 9,253,202 B2 | 2/2016 | Thakur | |
| 9,270,695 B2 | 2/2016 | Roytman et al. | |
| 9,436,820 B1 | 9/2016 | Gleichauf et al. | |
| 9,467,464 B2 | 10/2016 | Gula et al. | |
| 9,483,281 B2 | 11/2016 | Bonczkowski et al. | |
| 9,706,410 B2 | 7/2017 | Sreenivas et al. | |
| 9,727,728 B2 | 8/2017 | Avrahami et al. | |
| 2004/0128370 A1 * | 7/2004 | Kortright | H04L 69/329 |
| | | | 709/221 |
| 2005/0044418 A1 | 2/2005 | Miliefsky | |
| 2005/0216957 A1 | 9/2005 | Banzhof et al. | |
| 2005/0229256 A2 | 10/2005 | Banzhof | |
| 2006/0010497 A1 | 1/2006 | OBrien et al. | |
| 2006/0191012 A1 | 8/2006 | Banzhof et al. | |
| 2006/0195905 A1 | 8/2006 | Fudge | |
| 2010/0130178 A1 | 5/2010 | Bennett et al. | |
| 2010/0216429 A1 | 8/2010 | Mahajan | |
| 2010/0242114 A1 | 9/2010 | Bunker et al. | |
| 2011/0225275 A1 | 9/2011 | Shah et al. | |
| 2012/0046985 A1 | 2/2012 | Richter et al. | |
| 2013/0007865 A1 | 1/2013 | Krishnamurthy et al. | |
| 2013/0091534 A1 | 4/2013 | Gilde et al. | |
| 2014/0331326 A1 * | 11/2014 | Thakur | H04L 63/1433 |
| | | | 726/25 |
| 2015/0281287 A1 * | 10/2015 | Gill | H04L 63/20 |
| | | | 726/1 |
| 2015/0288709 A1 * | 10/2015 | Singhal | H04L 63/1416 |
| | | | 726/23 |
| 2016/0253364 A1 | 9/2016 | Gomadam et al. | |
| 2017/0220808 A1 | 8/2017 | Schmidt et al. | |
| 2017/0279799 A1 | 9/2017 | Baltzer et al. | |
| 2018/0096260 A1 | 4/2018 | Zimmer et al. | |
| 2018/0144139 A1 | 5/2018 | Cheng et al. | |
| 2019/0087832 A1 | 3/2019 | Mercury et al. | |
| 2019/0098028 A1 | 3/2019 | Ektare et al. | |
| 2019/0166149 A1 | 5/2019 | Gerrick | |
| 2019/0245878 A1 | 8/2019 | Ward et al. | |
| 2019/0245879 A1 | 8/2019 | Ward et al. | |
| 2019/0245880 A1 | 8/2019 | Ward et al. | |

\* cited by examiner

EXCEPTION REMEDIATION LOGIC ROLLING PLATFORM

FIELD

The present invention relates to identifying vulnerabilities in network components, and more particularly to automatically rolling exceptions for vulnerabilities to other network components.

BACKGROUND

Organizations utilize numerous network components (e.g., network devices, network applications, or the like) for the organization's operations. However, due to the large number of network components, opportunities are created for the occurrence of accidental or purposeful vulnerabilities in the network components. The vulnerabilities may be general vulnerabilities that are potential issues for all types of organizations regardless of the organization type, or may be specific vulnerabilities that are based on the organizations' specific uses and/or specific policies for the organizations' own network components. There exists a need to manage the vulnerabilities within an organization.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved monitoring and management of network components, including monitoring the network components to determine the vulnerabilities of network components, implementing remediation plans for the vulnerabilities, instituting remediation suppression for acceptable uses, instituting network component exceptions and rolling exceptions for network components, taking consequence actions for the vulnerabilities, and/or the like. The present invention provides an organization improved control over its network components, thus improving the security for an organization, by providing improved network component information collection and network component decisioning in order to remediate the vulnerabilities. The security of the network components is improved by allowing the organization to remotely monitor the network components for vulnerabilities and remotely control the network components (e.g., freeze at least a portion thereof, limit or prevent operation of the network component in a number of different ways, or the like). Additionally, the present invention provides improved efficiency in monitoring and taking actions with respect to the network components because the monitoring and control of the network components may occur remotely.

Embodiments of the invention relate to first determining the primary user 4 or owner of the network components (e.g., is listed as the owner, the user that is responsible for the network component, the user the uses the network component the most, the user that accesses the network component the most, or the like). Thereafter, the network components are monitored to identify vulnerabilities in the network components. Next, a remediation plan may be implemented, which may include alerting the primary user 4 of the vulnerability, automatically and remotely freezing at least a portion of the network component, providing processes for remediating the vulnerability, providing updates for network components to remove the vulnerability, or the like.

It in some embodiments of the invention, remediation suppression may be implemented for the user 4, vulnerability, network component, or the like when the vulnerability is determined to be an acceptable vulnerability. For example, the remediation suppression may be implemented when the user 4 requests an exception and it is granted, when an exception is granted based on organization policy, and/or when an exception is granted based on third party information. When remediation suppression is implemented the reporting of the vulnerability may be prevented). As such, even though a vulnerability has occurred, the vulnerability may be acceptable and thus at least a portion of the remediation process may be suppressed, the reporting of the vulnerability may be suppressed in order to prevent false notifications of the vulnerabilities, and/or any consequence actions associated with the vulnerability may be suppressed. It should be understood that while the reporting of the vulnerabilities may be suppressed, the remediation suppression, the vulnerabilities, the organization's policies, and/or the network components may still be monitored to make sure changes have not occurred that will change the suppression of the vulnerabilities. For example, the network components may be monitored to make sure company policy does not change that would make the suppression no longer valid, that the network components may have changed such that the network components may no longer have vulnerabilities, and/or the vulnerabilities are no longer considered vulnerabilities.

Alternatively, or in addition to remediation suppression, custom criteria may be created and used to identify rolling network component exceptions that automatically prevent identification and/or remediation of vulnerabilities for particular network components. It should be understood that the custom criteria may be set up by a user or automatically identified by the organization systems. If any current network component or new network components meets the custom criteria, the network component may be automatically rolled into network component exceptions processes in order to prevent a vulnerability action, such as identification of a vulnerability for the network component or remediation of the vulnerability for the network component.

Embodiments of the invention comprise systems, computer implemented methods, and computer program products for rolling network component exceptions to network components. The invention comprises accessing custom criteria for identifying the network component exceptions. The network components are monitored for network component data and the network component data is compared to the custom criteria in order to determine when the network component data for a network component meets the custom criteria. The invention further automatically operatively couples network component exception data with the network component when the network component data meets the custom criteria. A vulnerability action is prevented for the network component when the network component is determined have a network component exception. The invention comprises monitoring the network components or the custom criteria for changes that affect the network components that are operatively coupled to the network component exceptions.

In further accord with embodiment, the invention further comprises receiving the custom criteria, wherein the custom criteria is automatically determined based on a logic determination.

In other embodiments, the invention further comprises receiving the custom criteria from a user, wherein the custom criteria is defined by the user.

In still other embodiments of the invention, monitoring the network components comprises determining changes in the network component that results in a change in the network component exception.

In yet other embodiments of the invention, monitoring the custom criteria comprises determining changes in the custom criteria that result in a change in the network component exception.

In further accord with embodiments of the invention, automatically operatively coupling the network component exception to the network component comprises storing an indication of the network component exception to a list of the network component exceptions.

In other embodiments of the invention, automatically operatively coupling the network component exception to the network component comprises attaching exception data to the network component indicating that the network component includes the network component exception.

In still other embodiments of the invention, preventing the vulnerability action comprises preventing an indication that a vulnerability exists for the network component.

In yet other embodiments of the invention, preventing the vulnerability action comprises preventing implementation of remediation of a vulnerability for the network component.

In further accord with embodiments of the invention, preventing the vulnerability action comprises preventing reporting of the potential vulnerability.

In other embodiments, the invention further comprises tagging an association between the custom criteria with the network components that have the network component exceptions based on the custom criteria, and comparing the custom criteria with the network components when a change in the custom criteria or the network component occurs in order to determine changes in the network component exceptions.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
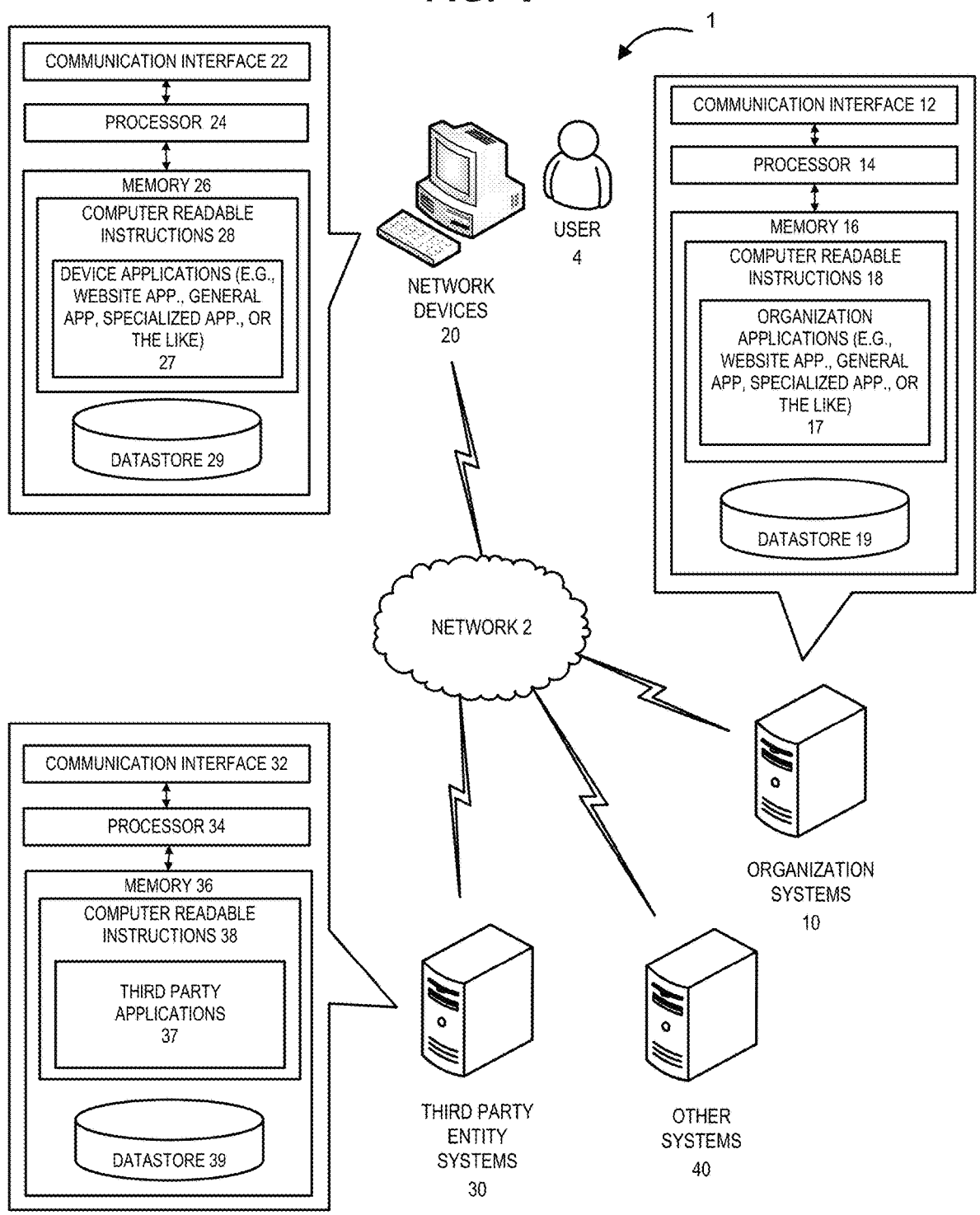

Having thus described embodiments of the invention in general terms, reference will now be made to the accompanying drawings, and wherein:

FIG. 1 illustrates a block diagram of a network device vulnerability system environment, in accordance with one or more embodiments of the invention.

Figure 2:
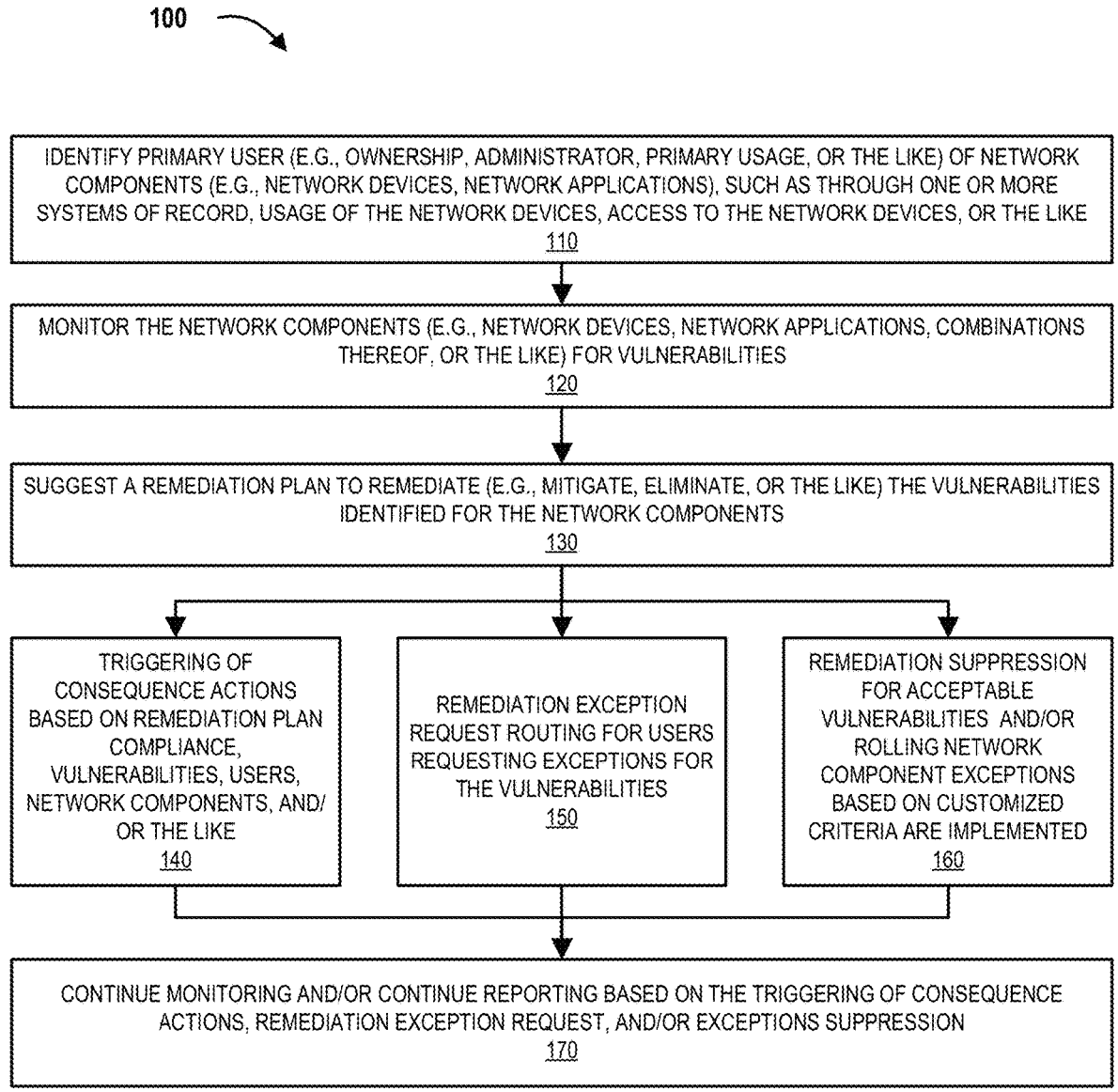

FIG. 2 illustrates a high level process flow for determining and decisioning network device vulnerabilities, in accordance with one or more embodiments of the invention.

Figure 3:
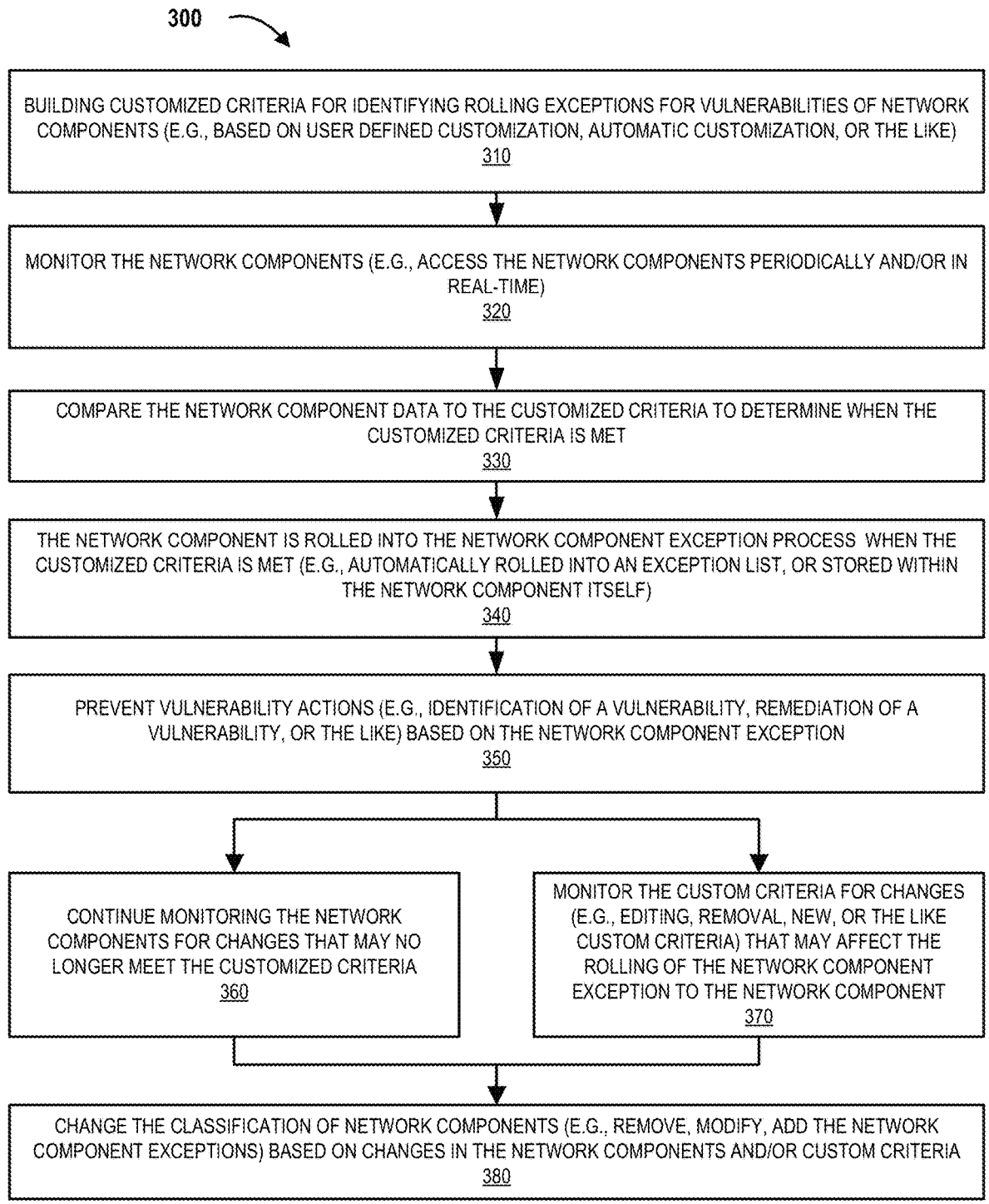

FIG. 3 illustrates a rolling network component exception process, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that monitor and manage network components, including determining the vulnerabilities of network devices and network applications, implementing remediation plans for the vulnerabilities, identifying exceptions for the vulnerabilities, suppressing reporting of the vulnerabilities, and taking consequence actions based on the vulnerabilities (e.g., suspending, blocking, removal, or the like of the network components).

FIG. 1 illustrates a network device vulnerability system environment 1, in accordance with embodiments of the invention. As illustrated in FIG. 1, one or more organization systems 10 are operatively coupled, via a network 2, to one or more network devices 20, one or more third-party systems 30, and/or one or more other systems 40. In this way, a user 4 (e.g., one or more associates, employees, agents, contractors, sub-contractors, third-party representatives, customers, or the like), may be associated with network components (e.g., network devices and/or network applications). It should be understood that the users 4 may be described as a primary user or owner of the network component (e.g., a user that "owns" the network component, a user that is responsible for a specific network component, a user that uses the network component the most, a user that uses the network component during a particular time period, or the like). As such the one or more organization systems 10 may be utilized to monitor the one or more network devices 20 (e.g., the network device hardware, network applications associated therewith, or the like), the one or more third party systems 30, and/or the other systems 40, and thereafter determine or take actions (e.g., remediation plan implementation, consequence actions, exception routing, exception suppression, or the like) for the one or more network devices 20, the one or more third party systems 30, and/or the other systems 40 (or applications thereof), as will be discussed in further detail herein. As such, embodiments of the present invention allow for increased security of the organization's network components using more efficient processes.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication interfaces 12, one or more processors 14, and one or more memories 16. The one or more processors 14 are operatively coupled to the one or more communication interfaces 12 and the one or more memories 16. As used herein, the term "processor" generally includes circuitry used for implementing the communication and/or logic functions of a particular system. For example, a processor 14 may include a digital signal processor, a microprocessor, and various analog-to-digital converters, digital-to-analog converters, and other support circuits and/or combinations of the foregoing. Control and signal processing functions of the system are allocated between these processors according to their respective capabilities. The one or more processors 14 may include functionality to operate one or more software programs based on computer-readable instructions 18 thereof, which may be stored in the one or more memories 16.

The one or more processors 14 use the one or more communication interfaces 12 to communicate with the network 2 and other components on the network 2, such as, but not limited to, the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memories 16, which in one embodiment includes the computer-readable instructions 18 of organization applications 17 (e.g., web-based applications, dedicated applications, specialized applications, or the like that are used to monitor, communicate with, and/or take actions with respect to the various network device hardware or software). In some embodiments, the one or more memories 16 include one or more data stores 19 for storing data related to the one or more organization systems 10, including, but not limited to, data created, accessed, and/or used by the one or more organization applications 17. The one or more organization applications 17 may be applications that are specifically used to monitor the network devices 20 and network applications 27, communicate with the network devices 20 and network applications 27, and take actions with respect to the network devices 20 and network applications 27 (e.g., remediate the vulnerabilities, allow for exceptions when requested, suppress the exceptions for reporting, and/or take consequence actions with respect to the network components, as will be described herein).

As illustrated in FIG. 1, users 4 may be associated with one or more of the network components (e.g., network devices 20, network applications 27, or the like). In some cases the users 4 may be primary users, such as uses associated (e.g., owner) with one or more network components, may be the users responsible for the one or more network components, or the like. Alternatively, in some cases the one or more network components may include user computer systems that allow the users 4 to communicate with and/or through the one or more organization systems 10. That is, in some cases, the users 4 may utilize the user computer systems to monitor the one or more network components (e.g., network devices 20, network applications 27, or the like) and/or take actions with respect to the one or more network components (e.g., network devices 20, network applications 27). Additionally, the user computer systems may also be considered one of the network components. As such, it should be understood that the one or more network components may be any type of device, such as a desktop, mobile device (e.g., laptop, smartphone device, PDA, tablet, watch, wearable device, or other mobile device), server, or any other type of system hardware that generally comprises one or more communication interfaces 22, one or more processors 24, and one or more memories 26, and/or the network components may include network applications 27 used by any of the foregoing, such as web browsers applications, dedicated applications, specialized applications, or portions thereof.

The one or more processors 24 are operatively coupled to the one or more communication interfaces 22, and the one or more memories 26. The one or more processors 24 use the one or more communication interfaces 22 to communicate with the network 2 and other components on the network 2, such as, but not limited to, the one or more organization systems 10, the one or more third-party systems 30, and/or the one or more other systems 40. As such, the one or more communication interfaces 22 generally comprise a wireless transceiver, modem, server, electrical connection, or other component for communicating with other components on the network 2. The one or more communication interfaces 22 may further include an interface that accepts one or more network interface cards, ports for connection of network components, Universal Serial Bus (USB) connectors and the like. Moreover, the one or more communication interfaces 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more network devices 20 may have computer-readable instructions 28 stored in the one or more memories 26, which in one embodiment includes the computer-readable instructions 28 for network device applications 27, such as dedicated applications (e.g., apps, applet, or the like), portions of dedicated applications, a web browser or other applications that allow the one or more network devices 20 to operate, that allow users 4 to take various actions using the network devices 20, or the like. For example, the users 4 may take actions with respect to one or more network devices 20, and/or may allow the users 4 to access applications located on other systems, or the like. In some embodiments, the users 4 utilize the one or more network devices 20 in the users' daily operations and/or the users 4 may utilize the one or more network devices 20 (e.g., user computer systems 20) to interact with the organization systems 10, other one or more network devices 20 (or applications 27 thereof), the one or more third-party systems 30, and/or the one or more other systems 40.

As illustrated in FIG. 1, the one or more third-party systems 30 may communicate with the one or more organization systems 10 and/or the one or more network devices 20 directly or indirectly (e.g., through the organization). The one or more third party systems 30, and/or third-party applications 37 thereof, may provide services for the one or more network devices 20 and/or the one or more organization systems 10. As such, the one or more third-party systems 30 are operatively coupled, via a network 2, to the one or more organization systems 10, the one or more network devices 20, and/or the other systems 40. The one or more third-party systems 30 generally comprise one or more communication interfaces 32, one or more processors 34, and one or more memories 36.

The one or more processors 34 are operatively coupled to the one or more communication interfaces 32, and the one or more memories 36. The one or more processors 34 use the one or more communication interfaces 32 to communicate with the network 2 and other components on the network 2, such as, but not limited to, the one or more organization systems 10, the one or more network devices 20, and/or the one or more other systems 40. As such, the one or more communication interfaces 32 generally comprise a wireless transceiver, modem, server, electrical connection, or other component for communicating with other components on the network 2. The one or more communication interfaces 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memories 36, which in some embodiments includes the computer-readable instructions 38 of one or more third party applications 37 that provide services to the one or more network devices 20 and/or the one or more organization systems 10. The access to the one or more third-party systems 30, or applications thereof, may be controlled by the one or more organization systems 10 and/or the one or more network devices 20, as will be described herein.

Moreover, as illustrated in FIG. 1, the one or more other systems 40 may be operatively coupled to the one or more organization systems 10, the one or more network devices 20, and/or the one or more third-party systems 30, through the network 2. The other like systems have features that are the same as or similar to the features described with respect to the one or more organization systems 10, the one or more network devices 20, and/or the one or more third-party systems 30 (e.g., one or more communication interfaces, one or more processors, and one or more memories with computer-readable instructions of one or more applications, one or more datastores, or the like). Thus, the one or more other systems 40 communicate with the one or more organization systems 10, the one or more network devices 20, the one or more third-party systems 30, and/or each other in same or similar way as previously described with respect to the organization systems 10, the network devices 20, and/or the third-party systems 30.

FIG. 2 illustrates a high level process flow for monitoring network components (e.g., network devices 20, network applications 27, combinations thereof, or the like), and suggesting remediation plans, identifying triggering for consequence actions for the network components, allowing for remediation exceptions and remediation suppression, and/or the like in response to identifying vulnerabilities with the network components. As illustrated in block 110 of FIG. 2, the primary user (e.g., owner assigned to the network component, administer, person with primary operation of the network components, and/or the like) of the network components may first be determined (e.g., identified from one or more systems of record, assigned based on the network component usage, assigned based on network component access, and/or the like). As will be described in further detail herein, the primary user may be determined by accessing one or more systems of record that store primary user details for the network components (e.g., network devices 20, network applications, or the like). It should be understood that if two or more systems of record conflict with each other, or do not include network component information regarding a primary user, the present invention may assign ownership to a user 4 based on the users 4 that access the network components, use of the network components, network traffic for the network components, or otherwise users 4 that can be tied to the network elements through electronic data. It should be understood that the identification of the primary user is described in further detail with respect to U.S. patent application Ser. No. 15/889,944 entitled "Network Device Owner Identification and Communication Triggering System" filed concurrently herewith, which is incorporated by reference in its entirety herein.

Block 120 of FIG. 2 illustrates that the network components are monitored for vulnerabilities. It should be understood that vulnerabilities of network components may be any type of vulnerabilities, such as but not limited to, data security breaches, unauthorized access, data that has been copied, elements that do not utilize passwords, elements that do not utilize additional authentication factors, devices that include eavesdropping, malware, spyware, ransomware, Trojan horses, viruses, worms, rootkits, bootkits, keylogger, screen scrapers, security flaw identifier, backdoors, logic bombs, payloads, denial of services software, elements do not have up-to-date software, allows downloading of data onto external drives, does not utilize screen locks, timed locks, or other electronic locking, systems that do not scan incoming or outgoing data, does not comply with physical security (e.g., is not properly stored, has been removed without authorization), does not have location determination activated, have applications downloaded without authorization, interacts with restricted hardware or software, accessed unsecure websites (e.g., that do not use encryption, or do not use https URLs). It should be understood that the vulnerabilities may be universal vulnerabilities that are general to all organizations, and/or may be specific to the organization (e.g., specific policy vulnerabilities for the organization as a whole or for a specific subset of the organization, such as a line of business, group, or the like). As such, the vulnerabilities may be general outside vulnerabilities to the network components, or specific policies of the organization that a network component and/or user 4 thereof may be violating. It should be understood that the vulnerabilities being monitored may be set by the organization and/or may be set by the third-party providing the network components (e.g., providing the network devices 20 and/or applications thereof). As will be discussed in further detail herein, the network components may be monitored automatically by the organization systems 10 and/or user computer systems in order to determine any vulnerabilities. The monitoring of the network components is discussed in further detail with respect to FIG. 3.

Block 130 of FIG. 2 illustrates that each of the vulnerabilities may have an associated remediation plan (e.g., a predetermined remediation plan, a plan developed based on the vulnerability, or the like). The proposed remediation plan may be suggested automatically based on the network elements, the user 4 associated with the network elements, the vulnerabilities, and/or the like, as will be discussed in further detail herein. The remediation plan suggested may include a notification to the primary user (e.g., owner, or the like) of the network component to remediate the vulnerability identified (e.g., mitigate, remove, update, or the like the vulnerability). The remediation plan may also include process steps (e.g., a procedure for remediating the vulnerability), updates (e.g., software updates), links thereto, or the like that can be utilized by the user 4 (e.g., primary user, or another user) to remediate the vulnerability. The notification may include a deadline for implementing the remediation plan and/or a deadline for completing remediation of the vulnerability. The suggestion of the remediation plan will be discussed in further detail with respect to FIG. 3.

Block 140 of FIG. 2 further illustrates that a trigger may occur if the remediation plan of the network component is not followed. As such, there may be a triggering of one or more consequence actions for the network component and/or primary user associated therewith. In some embodiments, the network components (e.g., network device, network application, combination thereof) may be suspended (e.g., at least a portion thereof may be prevented from operation, frozen, or the like) after a vulnerability is first identified. In some embodiments suspension of the network component, or portion thereof, may occur before and/or when the remediation is suggested, or in other embodiments, if the user 4 does not implement the suggested remediation plan before a particular remediation deadline. That is, a user 4 (e.g., an owner, or other user 4 using the network components) may be prevented from using the network components (e.g., the network device, network application, application accessed through the network device, portions thereof, or the like) until the vulnerability is remediated. As will be discussed in further detail later, in some embodiments of the invention, if the remediation is not implemented, for example, before a particular remediation deadline, a consequence action may be implemented. The consequence action my include removing the network component (e.g., disconnecting from the network, blocking access to the network 2, uninstalling, deactivating, powering down, or the like) as will be discussed in further detail herein.

Block 150 illustrates that in some embodiments, a user 4 may request a remediation exception for the identified vulnerability. That is, the user 4 may request an exception to allow for the continued use of the network component with the presence of the identified vulnerability (e.g., unfreeze the network component, prevent implementation of the remediation plan, and/or prevent the consequence action for the network component). For example, if the network component violates the organization policy, but is needed for a specific reason or falls within an exclusion, the user 4 may request continued use of the network component with the vulnerability without implementing the remediation plan. It should be understood that the remediation exception request routing is described in further detail with respect to U.S. patent application Ser. No. 15/889,949 entitled "Exception Remediation Logic Routing and Suppression Platform" filed concurrently herewith, which is incorporated by reference in its entirety herein.

Block 160 of FIG. 2 illustrates that in some embodiments, in response to the remediation exception, reporting of the associated vulnerability for the network component may be suppressed in order to prevent the implementation of the remediation plan and/or consequence actions for the vulnerability. Suppression of the reporting, the remediation plan, and/or the consequence actions may occur when the user 4 requests an exception and it is granted, when a remediation suppression is automatically granted based on organization policy, or the like. As such, reporting of the vulnerability may be prevented in order to prevent false notifications of the vulnerabilities (e.g., prevent unneeded reporting of the vulnerability if the vulnerability has been allowed). It should be understood that while the reporting of the vulnerabilities may be suppressed, the remediation suppressions, vulnerabilities, users 4, and/or network components may still be monitored to make sure changes have not occurred that will change the suppression of the vulnerabilities, the remediation plan, and/or the consequence actions. For example, the organization policies may be monitored in order to make sure policy changes do not occur that would result in the removal of the remediation suppression (e.g., the remediation suppression is no longer valid and is rescinded). It should be understood that the remediation suppression for acceptable vulnerabilities is described in further detail with respect to U.S. patent application Ser. No. 15/889,789 entitled "Exception Remediation Acceptable Use Logic Platform" filed concurrently herewith, which is incorporated by reference in its entirety herein.

Additionally, or alternatively with respect to block 160, the present disclosure indicates that instead of or in addition to remediation suppressing remediation, custom criteria may be created and used to identify rolling network component exceptions that automatically prevent remediation of vulnerabilities for particular network components before the vulnerabilities are identified and remediation begins. It should be understood that the rolling network component exceptions are described in further detail herein with respect to FIG. 3.

FIG. 2 further illustrates in block 170 that monitoring and/or reporting of the triggering, remediation exception requests, and/or rolling exceptions or suppression for the vulnerabilities of the network components are continued until the network components are removed and/or the rolling exceptions or suppressions are rescinded (e.g., no longer exceptions or suppression is no longer required due to remediation of the vulnerability, change in organization policies, or the like).

FIG. 3 illustrates the rolling network component exception process for automatically rolling network component exceptions to other network components and/or future network components. As illustrated by block 310 in FIG. 3, custom criteria for identifying exceptions for vulnerabilities of network components may be built. In some embodiments, the custom criteria may be built by a user 4 or may be automatically determined through logic, as will be discussed in further detail below. The custom criteria may allow for building criteria which may be used when monitoring network components to automatically identify network components that should have exceptions (e.g., network components that may technically violate the organizations policy, but which may be needed for proper operation of the network components and/or organization systems 10, or vulnerabilities that may be acceptable). As such, network component data may be included in the creation of the custom criteria for the network components in order identify network components that meet the custom criteria as the network components are monitored. For example, an organization may have X number of servers, but because of the types of servers Y number of servers may require interfacing with an application in a way that is against company policy. In this example, the Y servers may technically violate the organization's policies, but the violation is required in order for the Y servers to run properly. As such, the organization or a user 4 may operatively couple a network component exception to the Y servers to prevent a vulnerability action associated with the Y server (e.g., prevent identification of the potential vulnerability, and/or a portion of a remediation plan, such as prevent reporting, alerts, freezing, triggering of consequences, or the like). Operatively coupling the network component exception to the Y servers may include associating data to the Y servers (e.g., metadata, or the like), placing the Y servers on a list of network component exceptions, or the like, such that when monitoring the network components the system will not take a vulnerability action with respect to the network component with the exception (e.g., will not identify the network component as having a vulnerability and/or will not remediate the vulnerably after identification). Moreover, the user 4 and/or organization may create custom criteria that recites whenever a Y server is added to the organization, the system automatically rolls the Y server into the exception (e.g., operatively coupling the exception to the Y server, adds the new Y server a remediation exception list or storage, or the like). In other examples, based on organization policy application updates within the organization must occur with 45 days; however, for specific Z applications related to specific technology it may take 60 days to update Z applications because a more detailed analysis of the updates are required before implementation. As such, failing to make an update may typically show up as a vulnerability, but a network component exception may be applied to the Z applications. Moreover, custom criteria may be created, such that during monitoring of the network components anytime a Z application has not be updated within 45 of receiving an update, the system may automatically roll the Z application into the rolling exception process, such that vulnerability actions will not be taken for Z applications that take longer than 45 days to update. As such, the present invention allows a user to create custom criteria for automatically rolling network components into a network component exception process in order to prevent the system from identifying a network component as having a vulnerability when the same or similar network components have already been associated with a network component exception.

As briefly discussed above, in some embodiments, the custom criteria may be built by a user 4. For example, a user may create criteria (e.g., when new Y servers are identified automatically apply a rolling exception to the Y servers, when Z applications have not be updated within 45 days of an update automatically apply a rolling exception to the Z applications to move the 45 days to 60 days, or the like) such that during monitoring when the custom criteria is met the network component is automatically rolled into the network exception process. Alternatively, the system may automatically create the custom criteria. That is, the system may automatically identify that all Y servers have a remediation exception for an application, which is not found for X servers that have the same application. As such, the system may automatically create custom criteria, such that whenever the custom criteria is met the network component is automatically rolled into the network component exception process.

As such, by creating custom criteria, the user and/or organization can set up automatic rolling of network component exceptions to network components that meet the custom criteria. In this way, the user and/or organization do not have to wait until a vulnerability is identified on a particular network component before the vulnerability is determined to be acceptable and/or before the network component is applied to a network component exception.

Block 320 of FIG. 3 illustrates that that the network components are monitored. In some embodiments the monitoring may include the monitoring for vulnerabilities as previously generally described herein. Alternatively, the monitoring may include queries. The queries may include general queries for all of the network components for network component data, specific queries for specific network components for network component data, and/or a combination thereof. For example, the monitoring may include querying only the type of network components that are the subject of the custom criteria and/or rolling exceptions to determine the changes for these type of network components (e.g., pinging all network component types that have exceptions in order to determine if new components have been added that would be subject to the rolling exceptions).

It should be understood that the network components may be monitored in real-time or periodically by accessing the network component remotely and monitoring actions taken by the users 4 of the network component and/or the operation of the network components. Alternatively, the network components (e.g., devices and/or application) may store network component data (e.g., network device information, network application information, user information, such as user actions), and send such network component information to the organization system 10 or allow the organization systems 10 to access the network component data. As such, in some embodiments of the invention, the organization systems 10 (e.g., directly or through the use of the user computer systems) create a link with the network devices 20 and/or third-party systems 30 (e.g., if the third party is providing the network component) in order to monitor the network devices 20. Regardless of how the network components are monitored, the monitoring may result in the identification of network components that may be subject to rolling exceptions based on meeting custom criteria.

Block 330 of FIG. 3 illustrates that the network components being monitored are compared with the custom criteria in order to determine if any of the network components are subject to the rolling exceptions. Returning to the previous examples discussed herein, when a new Y server is identified that includes the application that is covered by the custom criteria, then the Y server may be identified as being subject to the rolling exception process. Returning to another example, the monitoring may identify the Z applications that require an update; however, some of the Z applications may have been updated, some of the Z applications are within the 45 day period required by the organization policies, some of the Z applications may not have been updated by the 45 days, but may be within the 60 days associated with the rolling exception, while some of the Z applications may be outside of 60 day exception. As such, when each Z application is compared with the criteria, the Z applications that have been updated or are within 45 days are not subject to the rolling exception, the Z applications that are over 45 days and under 60 days are subject to the rolling exception and are prevented from being subject to the remediation process, while the Z applications that are over the 60 day limit for updating are not subject to the rolling exception and will be moved to the remediation process. Since the network components may or may not be subject to the rolling exceptions (e.g., rolling on or off the exception list), the network components may be monitored over time to make sure the network components are being remediated and/or being properly identified as subject to a network component exception.

Based on the comparison discussed with respect to block 330, as illustrated by block 340 the network component of the present invention may be automatically rolled into a network component exception process (e.g., roll exception data on the network component, roll a reference to the network component onto an exception list, database, bucket, or the like). For example, as previously discussed herein, an indication of the network component exception may be operatively coupled to the network component (e.g., through metadata stored in or on the network component, or the like), may be added to a list of network component exceptions, or the like).

Block 350 of FIG. 3 illustrates that when a network component is identified as having a network component exception, the network component may be prevented from being associated with a vulnerability action. For example, in some embodiments, the system may prevent the network component from even being identified as having a vulnerability (e.g., system will not recognize that the component has a vulnerability due to the exception). Alternatively, the system may identify that the network component has a vulnerability, but remediation of the vulnerability is blocked because the network component has a network component exception.

FIG. 3 further illustrates in block 360 that the organization system (e.g., directly and/or through a user 4 using the user computer systems) continues to monitor the network components for changes that may result in the network components no longer meeting the custom criteria. For example, should the network component data illustrate that the network component no longer meets the custom criteria, then the network component exception may be removed and the network component may be sent to the remediation process. Returning to the previous examples, the Z applications may be monitored to determine when they are either updated or when they fall outside of the network component exception (e.g., more than 60 days and the Z application has not been updated). In the first case, the network component exception may be removed, and in the second case the network component exception may be removed and the network component is sent into the remediation process. It should be understood that the monitoring of the network components described with respect to block 360 may be monitored in the same way as previously discussed with respect to block 320.

Block 370 of FIG. 3 illustrates that the organization (e.g., directly through the organization systems 10, or indirectly through the user computer systems) continues monitoring the custom criteria in order to determine if there are any changes in the custom criteria. For example, the custom criteria may be changed, such as editing current custom criteria, removing custom criteria, and/or adding new custom criteria. The custom criteria may be changed by the user 4 or automatically, as described with respect to block 310 of FIG. 3. Returning to the examples, in some embodiments the custom criteria for the Z application may be changed such that it is no longer available for a network component exception (e.g., criteria is removed), the duration for the update is extended to 70 days (e.g., criteria is changed), the Z application only relates to use with particular data (e.g., criteria is added), or the like. As such, the custom criteria is monitored because any changes may affect the network component exceptions for different network components.

Block 380 of FIG. 3 illustrates that based on the continued monitoring of the network components and/or the custom criteria, the network component exceptions may be removed, edited, or added for various network components, as discussed with respect to blocks 360 and 370 above.

In some embodiments of the invention, each network component with a network component exception and/or the associated custom criteria is tagged with respect to each other. As such, anytime there is a change in the network component and/or the custom criteria each of the tagged related network components and/or the custom criteria are automatically reviewed in order to determine if the changes affect the other. That is, returning to the examples, if the custom criteria for updating the Z application is increased from 60 to 70 days the system may automatically query all of the tagged network components in order to determine if exceptions for any of the network components have changed.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/889,789 | EXCEPTION REMEDIATION ACCEPTABLE USE LOGIC PLATFORM | Concurrently herewith |
| 15/889,797 | VULNERABILITY CONSEQUENCE TRIGGERING SYSTEM FOR APPLICATION FREEZE AND REMOVAL | Concurrently herewith |
| 15/889,944 | NETWORK DEVICE OWNER IDENTIFICATION AND COMMUNICATION TRIGGERING SYSTEM | Concurrently herewith |
| 15/889,949 | EXCEPTION REMEDIATION LOGIC ROUTING AND SUPPRESSION PLATFORM | Concurrently herewith |

What is claimed is:

1. A system for rolling network component exceptions to network components, the system comprising:
    one or more memories having computer readable code stored thereon; and
    one or more processors operatively coupled to the one or more memories, wherein the one or more processors are configured to execute the computer readable code to:
        access custom criteria for identifying the network component exceptions;
        monitor the network components for network component data;
        compare the network component data to the custom criteria in order to determine when the network component data for a network component meets the custom criteria;
        automatically operatively couple network component exception data with the network component when the network component data meets the custom criteria;
        prevent a vulnerability action for the network component when the network component is determined to have a network component exception;
        apply tags to the custom criteria and the network components that have the network component exceptions;
        continue monitoring the network components or the custom criteria for changes that affect the network components that are operatively coupled to the network component exceptions;
        identify a change in the network components or the custom criteria; and
        query the tags of the custom criteria when the change in the network component is identified or the tags of the network components when the change in the custom criteria is identified, in each case to in order to determine changes in the network component exceptions.

2. The system of claim 1, wherein the one or more processors are configured to execute the computer readable code to:

receive the custom criteria, wherein the custom criteria is automatically determined based on a logic determination.

3. The system of claim 1, wherein the one or more processors are configured to execute the computer readable code to:
receive the custom criteria from a user, wherein the custom criteria is defined by the user.

4. The system of claim 1, wherein continue monitoring comprises monitoring the network components by determining changes in the network component that results in a change in the network component exception.

5. The system of claim 1, wherein continue monitoring comprises monitoring the custom criteria by determining changes in the custom criteria that result in a change in the network component exception.

6. The system of claim 1, wherein automatically operatively coupling the network component exception to the network component comprises storing an indication of the network component exception to a list of the network component exceptions.

7. The system of claim 1, wherein automatically operatively coupling the network component exception to the network component comprises attaching exception data to the network component indicating that the network component includes the network component exception.

8. The system of claim 1, wherein preventing the vulnerability action comprises preventing an indication that a vulnerability exists for the network component.

9. The system of claim 1, wherein preventing the vulnerability action comprises preventing implementation of remediation of a vulnerability for the network component.

10. The system of claim 1, wherein preventing the vulnerability action comprises preventing reporting of a potential vulnerability.

11. A computer implemented method for rolling network component exceptions to network components, the method comprising:
accessing, by one or more processors, custom criteria for identifying the network component exceptions;
monitoring, by the one or more processors, the network components for network component data;
comparing, by the one or more processors, the network component data to the custom criteria in order to determine when the network component data for a network component meets the custom criteria;
automatically operatively coupling, by the one or more processors, a network component exception with the network component when the network component data meets the custom criteria;
preventing, by the one or more processors, a vulnerability action for the network component when the network component is determined to have the network component exception; and
applying, by the one or more processors, tags to the custom criteria and the network components that have the network component exceptions;
continue monitoring, by the one or more processors, the network components or the custom criteria for changes that affect the network components that are operatively coupled to the network component exceptions;
identifying, by the one or more processors, a change in the network components or the custom criteria; and
query, by the one or more processors, the tags of the custom criteria when the change in the network component is identified or the tags of the network components when the change in the custom criteria is identified, in each case to in order to determine changes in the network component exceptions.

12. The method of claim 11, wherein the method further comprises:
receiving, by the one or more processors, the custom criteria, wherein the custom criteria is automatically determined based on a logic determination.

13. The method of claim 11, wherein the method further comprises:
receiving, by the one or more processors, the custom criteria from a user, wherein the custom criteria is defined by the user.

14. The method of claim 11, wherein continue monitoring comprises monitoring the network components by determining changes in the network component that results in a change in the network component exception.

15. The method of claim 11, wherein continue monitoring comprises monitoring the custom criteria by determining changes in the custom criteria that result in a change in the network component exception.

16. The method of claim 11, wherein automatically operatively coupling the network component exception to the network component comprises storing an indication of the network component exception to a list of the network component exceptions.

17. The method of claim 11, wherein automatically operatively coupling the network component exception to the network component comprises attaching exception data to the network component indicating that the network component includes the network component exception.

18. A computer program product for rolling network component exceptions to network components, the computer program product comprising at least one non-transitory computer-readable medium having computer-readable program code portions embodied therein, the computer-readable program code portions comprising:
an executable portion configured to access custom criteria for identifying the network component exceptions;
an executable portion configured to monitor the network components for network component data;
an executable portion configured to compare the network component data to the custom criteria in order to determine when the network component data for a network component meets the custom criteria;
an executable portion configured to automatically operatively coupling network component exception data with the network component when the network component data meets the custom criteria;
an executable portion configured to prevent a vulnerability action for the network component when the network component is determined to have a network component exception;
an executable portion configured to apply tags to the custom criteria and the network components that have the network component exceptions;
an executable portion configured to continue monitoring the network components or the custom criteria for changes that affect the network components that are operatively coupled to the network component exceptions;
an executable portion configured to identify a change in the network components or the custom criteria; and
an executable portion configured to query the tags of the custom criteria when the change in the network component is identified or the tags of the network components when the change in the custom criteria is identified, in each case to in order to determine changes in the network component exceptions.

19. The computer program product of claim 18, wherein the computer-readable program code portions further comprise:

an executable portion configured to receive the custom criteria, wherein the custom criteria is automatically determined based on a logic determination.

20. The computer program product of claim 18, wherein the computer-readable program code portions further comprise:

an executable portion configured to receive the custom criteria from a user, wherein the custom criteria is defined by the user.

* * * * *